Figure 1:
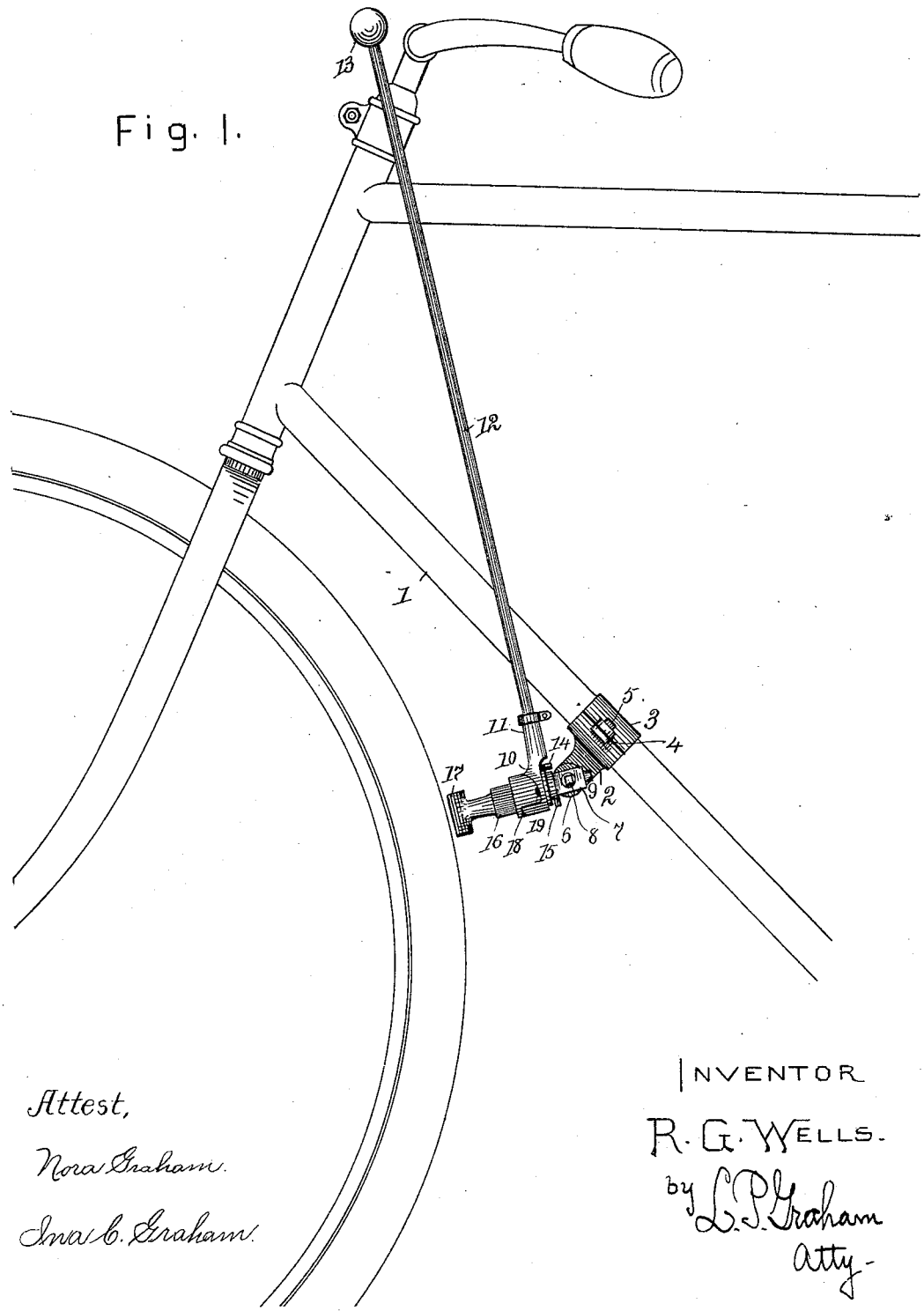

(No Model.) 2 Sheets—Sheet 1.

R. G. WELLS.
BICYCLE SUPPORT.

No. 567,015. Patented Sept. 1, 1896.

Attest,
Nora Graham.
Ina C. Graham.

INVENTOR
R. G. Wells.
by L. P. Graham
atty.

(No Model.) 2 Sheets—Sheet 2.
R. G. WELLS.
BICYCLE SUPPORT.
No. 567,015. Patented Sept. 1, 1896.
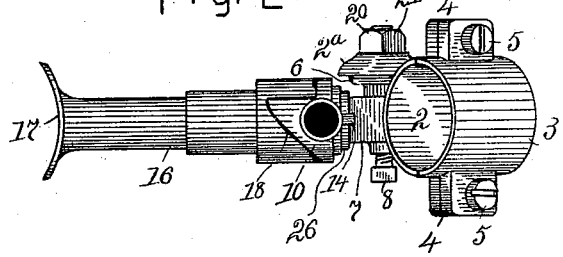
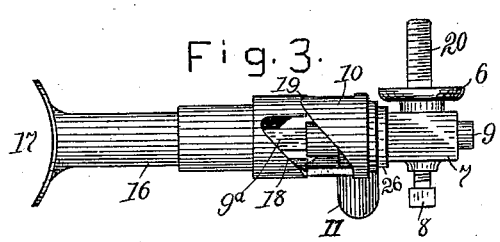
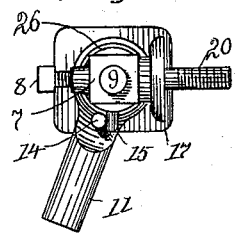
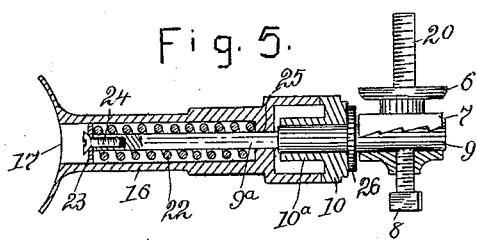
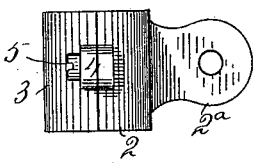
Attest
Nora Graham
Ina C. Graham
INVENTOR
R. G. Wells
by L. P. Graham
Atty.

UNITED STATES PATENT OFFICE.

ROBERT G. WELLS, OF DECATUR, ILLINOIS.

BICYCLE-SUPPORT.

SPECIFICATION forming part of Letters Patent No. 567,015, dated September 1, 1896.

Application filed April 27, 1896. Serial No. 589,182. (No model.)

*To all whom it may concern:*

Be it known that I, ROBERT G. WELLS, of Decatur, in the county of Macon and State of Illinois, have invented certain new and useful Improvements in Bicycle-Supports, of which the following is a specification.

This invention is designed to provide light, substantial, and inexpensive supports that may be attached to bicycles and carried therewith, and that will firmly sustain the bicycles when properly placed. It is exemplified in the structure hereinafter described, and it is defined in the appended claims.

In the drawings forming part of this specification, Figure 1 is a side elevation of a support constructed in accordance with my invention and so much of a bicycle as is needed to show the mode of application of the support. Fig. 2 is a representation of the presser-bar of the support, such bar being in an inoperative condition. Fig. 3 shows the presser-bar in an extended condition, as it appears when the support is in use. Fig. 4 is an end view of the presser-bar. Fig. 5 is a longitudinal section through the presser-bar. Fig. 6 is a representation of the clamp used to connect the presser-bar with a bicycle-frame.

The rod of a bicycle-frame nearest the front wheel is shown at 1 in Fig. 1, and with such rod the support is connected. A clamp adapted to embrace the rod 1 of the bicycle-frame comprises parts 2 and 3, having coincident lugs 4, and screws 5 are used to draw the two parts together and clamp them firmly onto the rod. Part 2 of the clamp has an extension $2^a$, that forms a friction-disk, and through the center of such disk a bolt-hole extends. A head 7 has a longitudinal bore, a lateral disk 6, that corresponds with the disk of the clamp, a bolt 20, that extends laterally from the center of disk 6 and through the hole of extension $2^a$, and a set-screw 8. A bolt 9 extends through the longitudinal bore of the head 7, and it is held therein, in a manner permitting adjustment, by means of set-screw 8. A thrust-collar 26 is formed on or fastened onto the bolt 9 near the normal location of head 7. That part of the bolt next the thrust-collar is circular in cross-section and it forms a bearing for sleeve $10^a$ of the cam 10 of the supporting-rod 12. That part of the bolt designated by $9^a$ is square or prismatic in cross-section, and it is drilled and tapped in its end to receive a screw 24. Shell 16 has a concave bearing-surface 17 formed on its outer end, and it is internally diminished at 25 to conform to the square part of the bolt. A spiral compression-spring 22 surrounds the square part of the bolt. It bears at one end against the shoulder of the shell formed by the internal contraction and at the other end against washer 23, which is held by screw 24 against the end of the square part of the bolt. The spring tends to press the inner end of the shell against the cam of the supporting-rod, and the shell has cam-surfaces, as indicated at 18, that conform to the surfaces of cam 10. A socket 11 extends radially from cam 10, and it is adapted to receive an end of the supporting-rod 12. The rod may be secured in the socket of the cam in any desirable manner, preferably, however, in a manner permitting detachment. It may be made extensible lengthwise when intended for use with different bicycles, and it is preferably supplied with a rubber ball or knob, as 13, on its swinging end. A radially-extended pin on the thrust-collar of bolt 9, (designated by 15,) engages with a stop-pin 14 on cam 10 and positively prevents downward swing of the supporting-rod beyond a certain point. The salient cam-surfaces of the shell have slight depressions, as 19, in which the points of cam 10 rest when the supporting-rod is in a supporting position.

In attaching the support to a bicycle the clamp is slipped along bar 1 until its proper place is ascertained as nearly as possible and is then tightened. The presser-bar is swung up or down to bring it approximately in line with a radius of the bicycle-wheel and the supporting-rod in proper relation to the steering-rod and handle-bar of the bicycle, and is then set firmly in position by tightening nut 21 on bolt 20. If the foot 17 of the shell of the presser-bar should not be exactly the right distance from the tire of the wheel, the set-screw 8 may be loosened, the bolt slid in the head in the proper direction and to the proper extent, and the set-screw be retightened.

So long as the bicycle is in use the supporting-rod remains swung upward, as indicated in Fig. 1. Its upper end occupies a position in front of the upper end of the steering-rod out of the way of the swing of the handle-bar, and the presser-bar and clamp are out of the way of the pedals.

When it is desired to support the bicycle, the front wheel is swung into alinement with the frame, and the supporting-rod is swung downward until the pin 14 strikes the pin 15 and the points of the cam 10 are in depressions 19 of the cam-surface of the shell. When this is done, the foot of the presser-bar will be pressed against the tire of the front wheel of the bicycle to such an extent that such wheel cannot swing sidewise and the bicycle cannot move forward or backward. At this juncture the bicycle is leaned over until the knob 13 of the supporting-rod touches the ground, when the operation is completed.

The spring tends always to carry the presser-foot away from the wheel, and this peculiarity is utilized in holding the supporting-rod yieldingly against rising.

The compression of the spring must be slightly increased to carry the points 10 out of depressions 19, and so the rod is held in a supporting position until thrown upward by hand.

When the rod is swung upward to the position shown in Fig. 1, the spring forces the foot of the presser-bar away from the tire of the wheel.

Having thus described my invention, I claim as new and desire to secure by Letters Patent—

1. A support for a bicycle consisting of an extensible presser-bar adapted to be secured to a bar of the bicycle-frame, in position to engage the front wheel when extended, and a supporting-rod swingable on the presser-bar and adapted to extend such presser-bar when swung downward, substantially as set forth.

2. A support for a bicycle consisting of an extensible presser-bar adapted to be secured to a bar of the bicycle-frame in position to engage the front wheel when extended, a spring resisting extension of the presser-bar, and a supporting-rod swingable on the presser-bar and adapted to extend such presser-bar when swung downward, substantially as set forth.

3. A support for a bicycle consisting of a clamp adapted to be fastened to a bar of the bicycle-frame in proximity to the front wheel, an extensible presser-bar connected with the clamp in a manner permitting vertical swinging adjustment and adapted to engage the front wheel when extended, and a supporting-rod swingable on the presser-bar and adapted to extend the same when swung downward, substantially as set forth.

4. In a bicycle-support, an extensible presser-bar consisting of a non-rotatable bolt, a non-rotatable shell supplied with a presser-foot and mounted on the bolt in a manner permitting motion lengthwise thereof, a thrust-collar on the bolt, a spring tending to force the shell toward the thrust-collar, a cam journaled on the bolt between the shell and the thrust-collar, and a supporting-rod connecting with the cam, substantially as set forth.

5. A bicycle-support consisting of a clamp adapted to embrace a rod of a bicycle-frame, a head connectd with the clamp in a manner permitting rotary adjustment, a bolt longitudinally adjustable in the head, a thrust-collar fixed on the bolt, a shell having lengthwise, but not rotary, motion on the bolt, a spring tending to force the shell toward the thrust-collar, a cam on the bolt between the shell and the thrust-collar and a supporting-rod connecting with the cam, substantially as set forth.

6. A bicycle-support consisting of a bolt having a thrust-collar, a shell on the bolt equipped with a presser-foot, a spring tending to force the shell toward the thrust-collar, a cam on the bolt between the thrust-collar and the shell, a stop projection on the cam adapted to strike a stop projection on the thrust-collar, the end of the shell next the cam having cam-surfaces and also having depressions as 19 in its salient cam-surfaces, substantially as set forth.

In testimony whereof I sign my name in the presence of two subscribing witnesses.

ROBERT G. WELLS.

Attest:
C. M. LYTLE,
T. T. ROBERTS.